United States Patent Office.

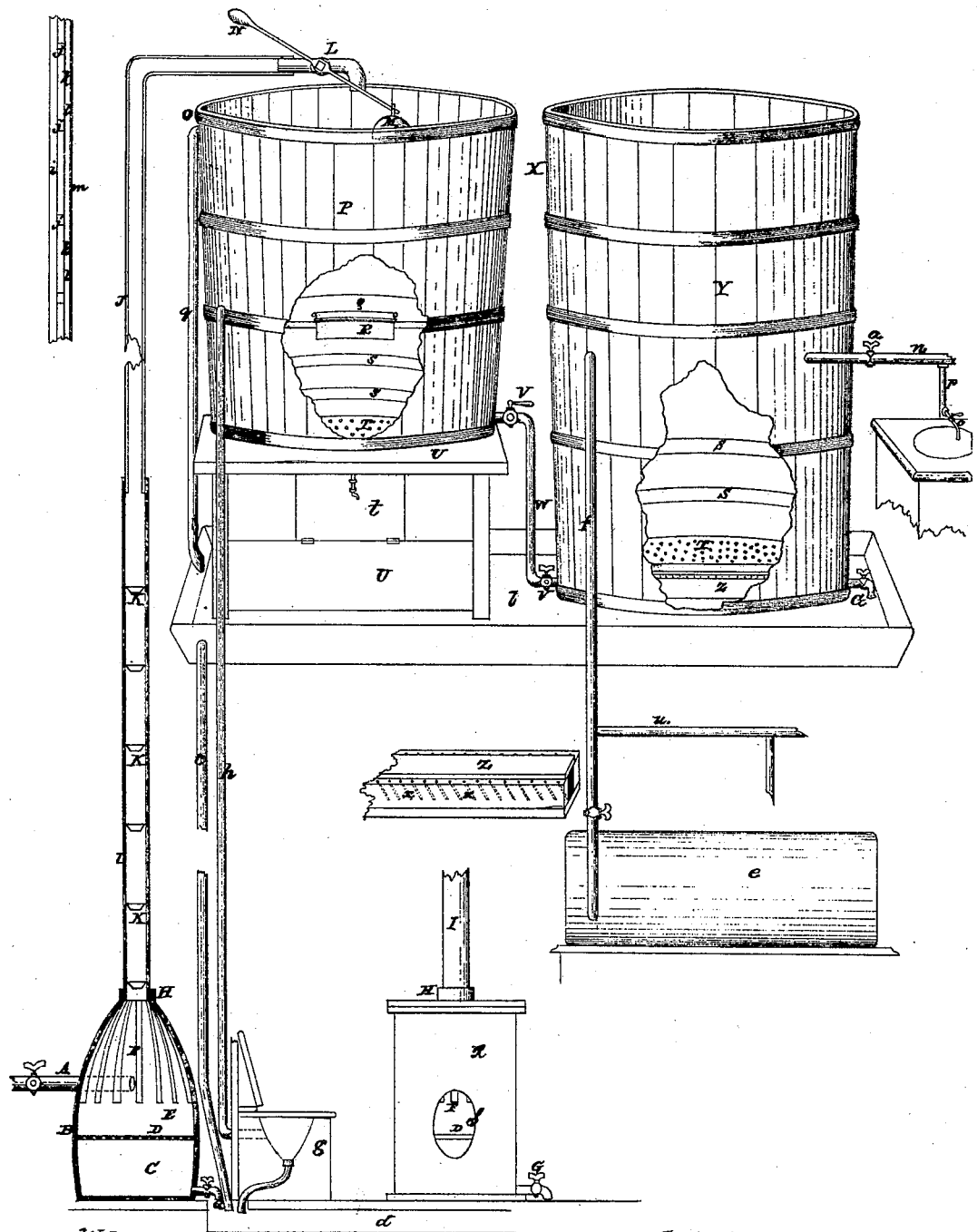

JOHN A. THOMPSON, OF AUBURN, ASSIGNOR TO AMERICAN WATER-PURIFYING COMPANY, OF BUFFALO, NEW YORK.

*Letters Patent No. 101,544, dated April 5, 1870; antedated March 25, 1870.*

IMPROVED PROCESS AND APPARATUS FOR SUPPLYING PURE WATER TO BUILDINGS.

The Schedule referred to in these Letters Patent and making part of the same.

*To all whom it may concern:*

Be it known that I, JOHN A. THOMPSON, of Auburn, in the county of Cayuga and State of New York, have invented a new and improved Mode of Introducing, Filtering, Purifying, and Distributing Water in Buildings; and I do declare that the following is a full and exact description of the same, reference being had to the accompanying drawings and to the letters marked thereon.

The object of my invention is to furnish pure water to all parts of buildings, as the same may be requisite for culinary, toilet, and other purposes.

To accomplish this I provide, first, a sedimentary separating apparatus, connecting the same with the incoming service-pipe, leading from the main, in this separating apparatus, by a series of deflecting planes projected from the side of the cone and tube, checking the current force of the water. Most of the suspended sediment is forced down into a chamber, from which it can be readily removed, the water passing vertically up to a downward filter, into which it is let off by means of a proper float and cock. The water from this chamber is then passed through a double strainer into the disinfecting and deodorizing section, from which it falls and is conveyed, by connecting-cocks and tube, to the bottom of an ascending filter, in its passage through which it is fully purified from all objectionable matter. From this reservoir it may be distributed, free from extra pressure, to all points where pure water is desirable, the closet supply being drawn from the first incoming-reservoir, thus saving the exhaust of the purifying material for this purpose. For the purpose of preventing fermentation taking place in the tank-room, I inclose the same by non-conducting walls and air-spaces, and maintain a low temperature by means of a refrigerating box filled with ice, the same arrangement securing against freezing in winter.

To enable others skilled in the art to make and use my invention, I will proceed to describe its construction and operation.

I construct my sedimentary separating-cone B and tube I of cast-iron or other suitable material, making the cone about one and a half foot in diameter at the base, and thirty inches high, providing the same with a dirt-discharge cock, G, perforated bottom D, about ten inches above the main bottom. The wall of the cone for about five inches above this bottom is left smooth or plain, as shown at E. Above this I project deflecting planes, projecting from the inner wall of the cone, out from, backward and inward, toward the incoming stream of water from the service-pipe A, which pipe is made to enter, so as to direct its current against the wall, and the flanges, which, standing out one to two inches, break the current and causes the sediment to fall and be washed, by the circulation of the water upon the perforated plate, down through the same to the chamber below, pipe I being armed with similar flanges K K K, projected down and in from its internal wall, standing out about one-half inch. The pipe being three inches in its internal diameter, will catch the floating sediment in its ascent, and, when the current force is removed, will allow it to fall into the cone, and be passed into its appropriate chamber C. These flanges are marked K K K.

Pipe I may connect with a plain or flangeless pipe, as shown at J, which discharges by cock L, loaded float M and N, into filter O. This tank should be made about four feet in diameter at top, and four feet high.

A perforated bottom, T, should be raised about three inches from the main bottom, upon which I place a layer of gravel or broken quartz, coarse at bottom and then fine above, about two inches in thickness.

Upon this I pack, moderately firm, about one foot deep of prepared disinfectant charcoal, granulated, so as to pass a three-eighth-inch-mesh sieve, and I remove the fine dust from this by a thirtieth-inch-mesh sieve, or by washing.

On this I place a broad cover, Q, which is held firm in place by means of a one-half square lining-hoop, nailed to side of the tank. This cover is perforated in the center, so as to receive a metal ring about twelve inches in diameter, standing about one-half inch above the plane of the cover Q, and having a projecting rim at top, so as to secure the flannel strainers by means of a ring of wire sprung around the outside of the strainer-ring R.

$b$ is a tube passing from this reservoir at about one inch above cover Q down to supply the closet $g$ with unfiltered water.

$q$ is an overflow-tube, conveying the water in case of accident to water-basin $b$. This enters by means of connecting-cock at high-water mark.

Tank O is also tapped by cock V, beneath its perforated bottom, to pass the water or to enter perforated tube Z, by means of cock V, from which it is forced to pass up through numerous small apertures $x$, which divides the current and weakens its force. It then passes up quietly through the perforated bottom T, through a bed of gravel and disinfectant charcoal, made to pass a one-fourth-inch-mesh sieve, packed closely and covered with a layer of gravel and fine sand, about three to four inches in thickness, sufficient to hold the coal in place.

Both this upward and the downward filter are supplied with flanges S S, projecting in O down, and in X up and in, preventing the flow of water between the filtering material and stave or side of the tanks.

Tube $f$ conveys the pure water from reservoir Y to boiler $e$. Branch tube $n$ conveys the water to basin $r$.

At the bottom of filter X, opening into the bottom of perforated tube Z, is cock $a$, for the removal of sediment from tube Z. Basin $b$ rests upon the floor of tank-room, and rises on the sides sufficient to secure, with overflow-pipe C, against all possible damage from bursting of tanks or pipes.

In this basin and under tank O, I construct, of galvanized iron or other suitable material, an ice-box, $u$, with drip-tube opening into basin $b$. Door $t$ is closed on a felt packing, so as to be air-tight, needing no ventilation.

To render the tank-room secure against heat in summer and cold in winter, I nail strips of wood horizontally to the studs on the plastered wall. Upon this I nail and cement No. 20 trunk-board, rendered water-proof by paint and glue. I then nail strips vertically upon this, and apply a thick board, No. 9, also made water-proof. This I apply to sides and ceiling, making the floor double with a layer of thin trunk-board between, thus securing a uniform and desirable cold room, the water drawn always cool and refreshing, and as pure as the mountain spring.

The advantage of this system over the ordinary are, first, all sediment is caught in the chamber C and tube I, or upon the cover of tank O, and can be removed before entering the filters; a perfect safe system of reservoir space; perfect and full purification of the water, free from all lead or poisonous metal from tubes or tank-linings; the cone B and vertical tubes I and J being of iron are rat-proof; the float M always securing an easy inlet; no water-hammer to burst pipes, or undue pressure of pump, or reservoir; less weight of tube to be furnished, as there is no pressure upon them, except that from the elevation of the reservoir of pure water; the boiler is at all times supplied with the purest of water, which is supplied to bath, laundry, and cooking, toilet, and other purposes.

At R I have shown a form of depositing apparatus, a little more expensive, but may be preferred, the internal parts the same as B.

I join my pipe different from the ordinary welded joint or the ordinary soldered joint. I provide a tube lined with a readily-flowing solder, made in the same manner as tin-lined pipe, the internal diameter of this solder-lined pipe being precisely the same as the outside diameter of the pipe to be united. I cut sections for securing one-inch pipe, about one and one-half inch in length, turn the outer edge off, cut the ends of the pipes to be united so they will meet evenly, tin their outer surface for one inch, and force the two ends together, so as to meet in the solder-lined section by means of a double lever-clamp, which will hold the two sections of pipe firm and force them together. The soldering may be perfected by means of a heavy metal clamp, which will fit the outer solder-lined section, and, by heating the clamp to a degree requisite to cause the solder to flow, a perfect union can be secured at a low rate of cost. It may also be accomplished by means of a lamp, or a lamp and blow-pipe.

I join the staves and heading of my tanks by an elliptical metal tongue, for the size described, about five-eighths inch in width, and fourteen inch gauge. This is formed with a double edge, so as to drive into a groove sawn by a saw one-sixteenth-inch gauge. By this means I secure a perfect and continuous tight tank, which for house purposes is an important necessity.

I do not claim downward filter O, the upward filter X, with their deflecting planes S S S S, perforated tube Z underlying the perforated bottom T, the same essentially having been secured to me by Letters Patent; but

I claim as new—

1. The combination of the board cover with the straining apparatus, as described and for the purpose set forth.

2. The sedimentary separating cone or base B, with its deflecting planes, perforated bottom and inlet with the flanged pipe P, plain pipe J, in combination with downward filter O, upward filter X, ice-box $u$, basin $b$ with its distributing-pipes, substantially as described and for the purposes set forth, in combination with non-conducting walls $m$.

3. The method herein described for introducing, purifying, filtering, and distributing water in buildings, the same consisting in the combination of the several processes of separating and disposing of the sediment, downward and upward filtration, purification by disinfection, and refrigeration, substantially as described and specified.

JOHN A. THOMPSON.

Witnesses:
EDM. F. BROWN,
H. N. MYGATT.